United States Patent
Leahy et al.

(10) Patent No.: US 8,353,673 B2
(45) Date of Patent: Jan. 15, 2013

(54) MAIN ROTOR BLADE WITH INTEGRAL CUFF

(75) Inventors: Kevin P. Leahy, Naugatuck, CT (US); Richard Joseph Simkulak, Meriden, CT (US); David A. Kovalsky, Huntington, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1297 days.

(21) Appl. No.: 12/110,312

(22) Filed: Apr. 26, 2008

(65) Prior Publication Data

US 2009/0269205 A1   Oct. 29, 2009

(51) Int. Cl.
*B64C 11/20* (2006.01)

(52) U.S. Cl. .............. 416/226; 416/239; 416/210 R; 416/248

(58) Field of Classification Search .......... 416/1, 226, 416/228, 239, 248
See application file for complete search history.

(56) References Cited

U.S. PATENT DOCUMENTS

| | | | | |
|---|---|---|---|---|
| 3,734,642 | A | * 5/1973 | Dixon | ............. 416/61 |
| 4,728,263 | A | * 3/1988 | Basso | ............. 416/226 |
| 5,475,622 | A | 12/1995 | Reinfelder et al. | |
| 5,832,605 | A | 11/1998 | Leahy et al. | |
| 5,836,062 | A | 11/1998 | Leahy et al. | |
| 5,862,576 | A | 1/1999 | Leahy et al. | |
| 5,885,059 | A | * 3/1999 | Kovalsky et al. | ............. 416/224 |
| 6,024,325 | A | 2/2000 | Carter, Jr. | |
| RE37,774 | E | 7/2002 | Leahy et al. | |
| 6,659,722 | B2 | 12/2003 | Schgal et al. | |
| 6,976,829 | B2 | * 12/2005 | Kovalsky et al. | ............. 416/226 |
| 7,165,945 | B2 | 1/2007 | Kovalsky et al. | |
| 7,811,061 | B2 | * 10/2010 | Bianchi et al. | ............. 416/134 A |
| 2007/0280828 | A1 | 12/2007 | Bianchi et al. | |

FOREIGN PATENT DOCUMENTS

| | | |
|---|---|---|
| EP | 0085129 A1 | 6/2008 |
| EP | 0085129 B1 | 6/2008 |

OTHER PUBLICATIONS

PCT International Search Report and Written Opinion, mailed Nov. 10, 2009.
S-92 Tip Cap drawing, pp. 5 and 6.
S-92 Skins & Core Assembly drawing, pp. 10 and 11.
S-92 Spar drawing, p. 16.

* cited by examiner

*Primary Examiner* — Ninh H Nguyen

(74) *Attorney, Agent, or Firm* — Carlson, Gaskey & Olds PC

(57) ABSTRACT

A main rotor blade assembly includes a main spar with an integral cuff. The main spar is directly to a rotor hub assembly through the integral cuff.

24 Claims, 25 Drawing Sheets

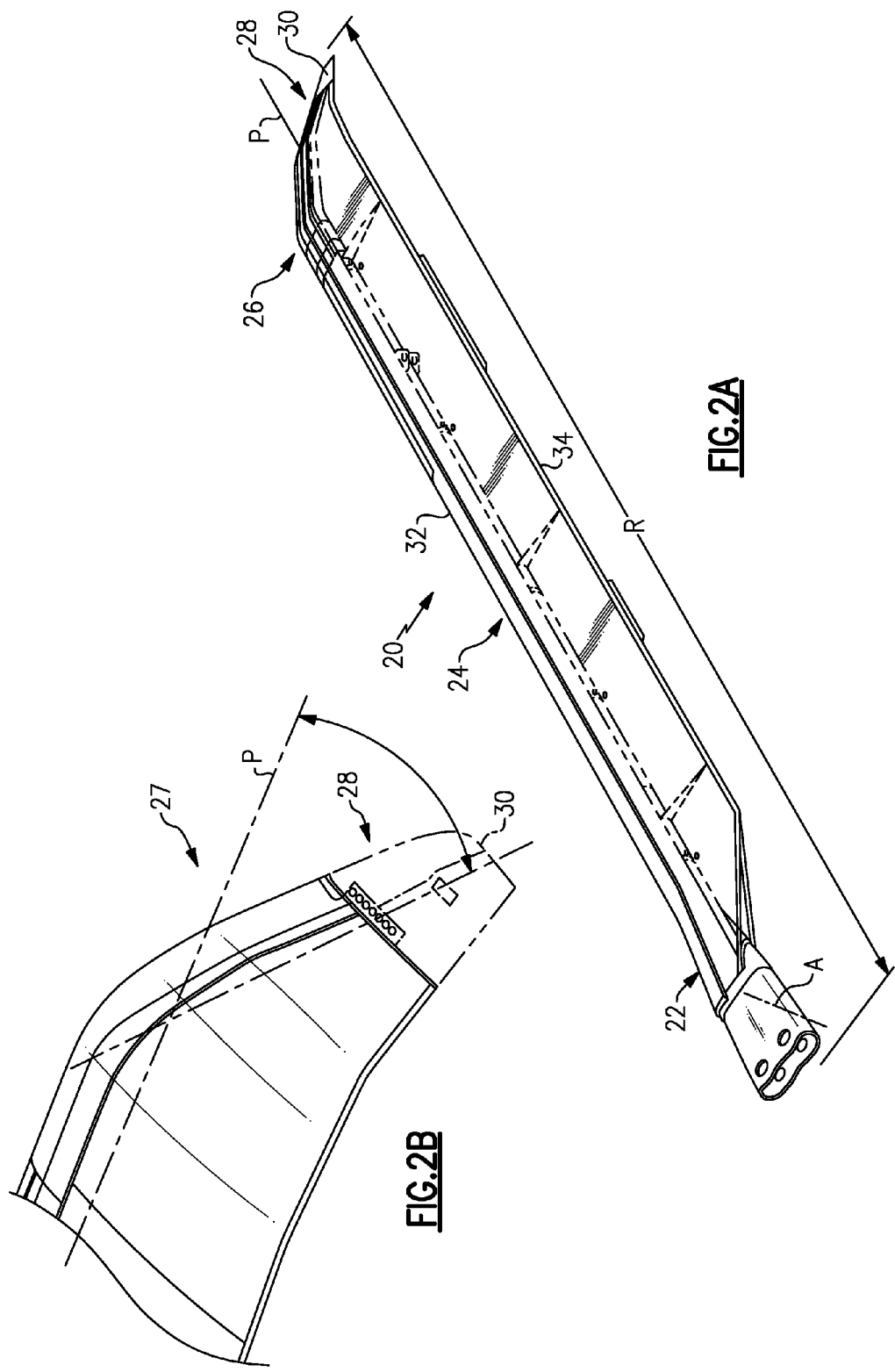

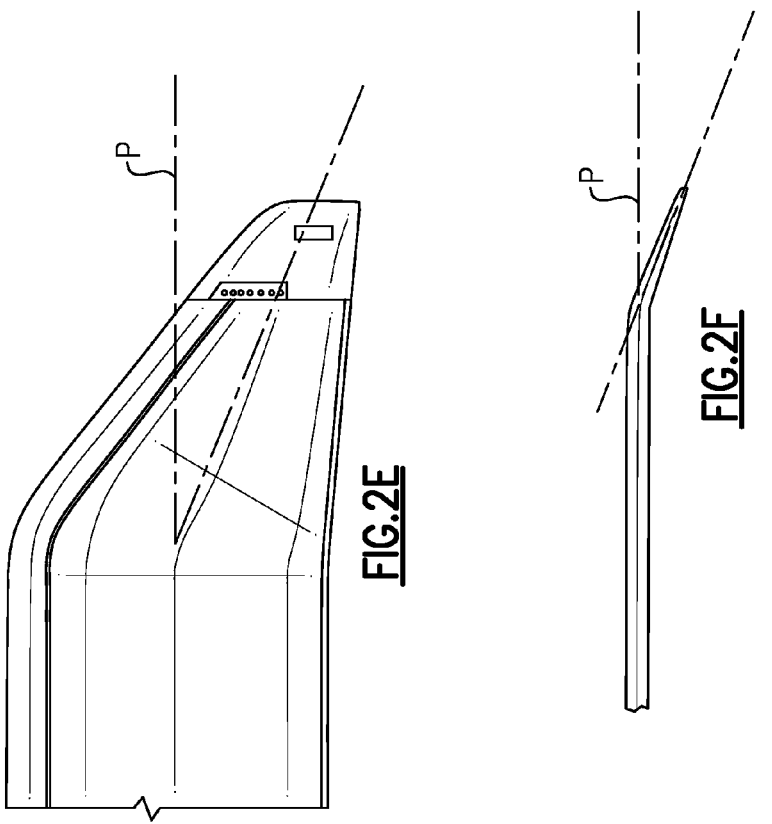
FIG.2E
FIG.2F
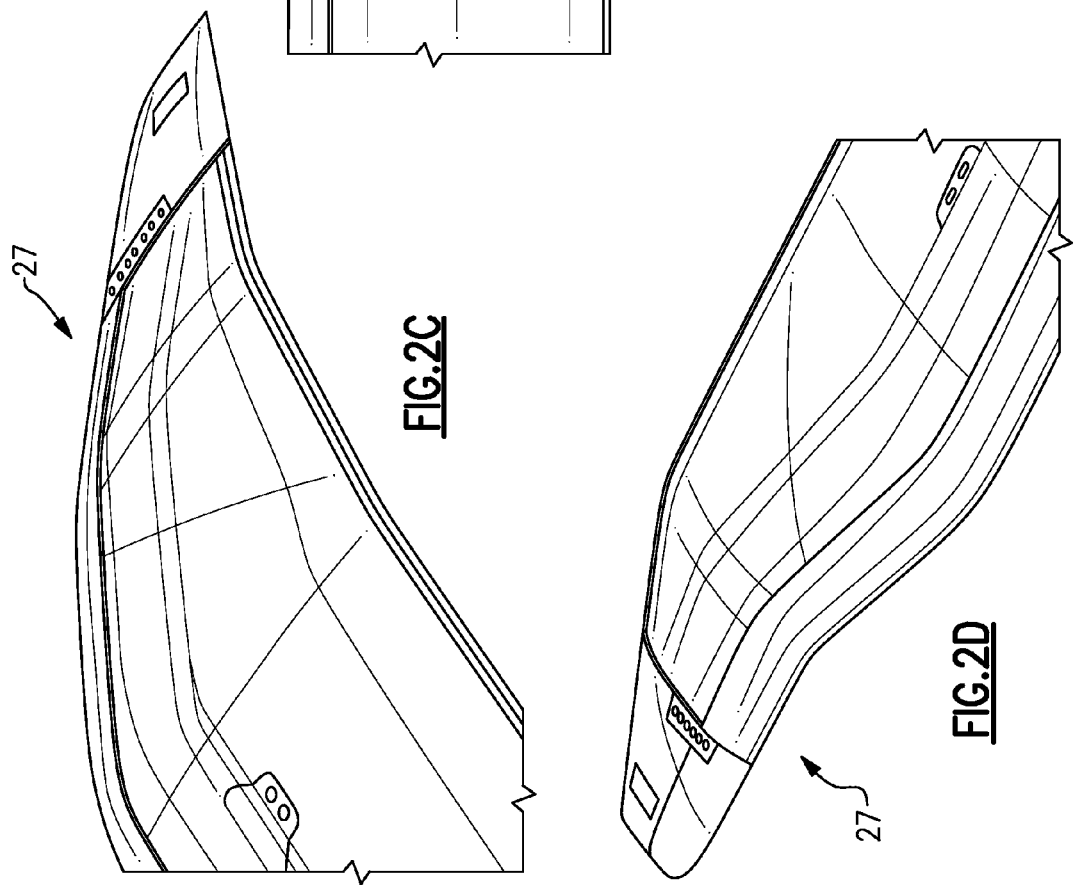
FIG.2C
FIG.2D

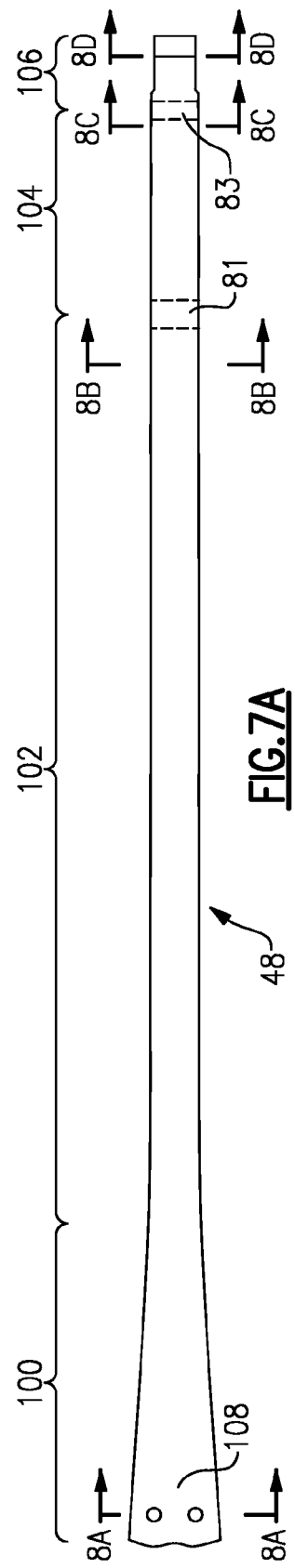
FIG.7A
FIG.7B

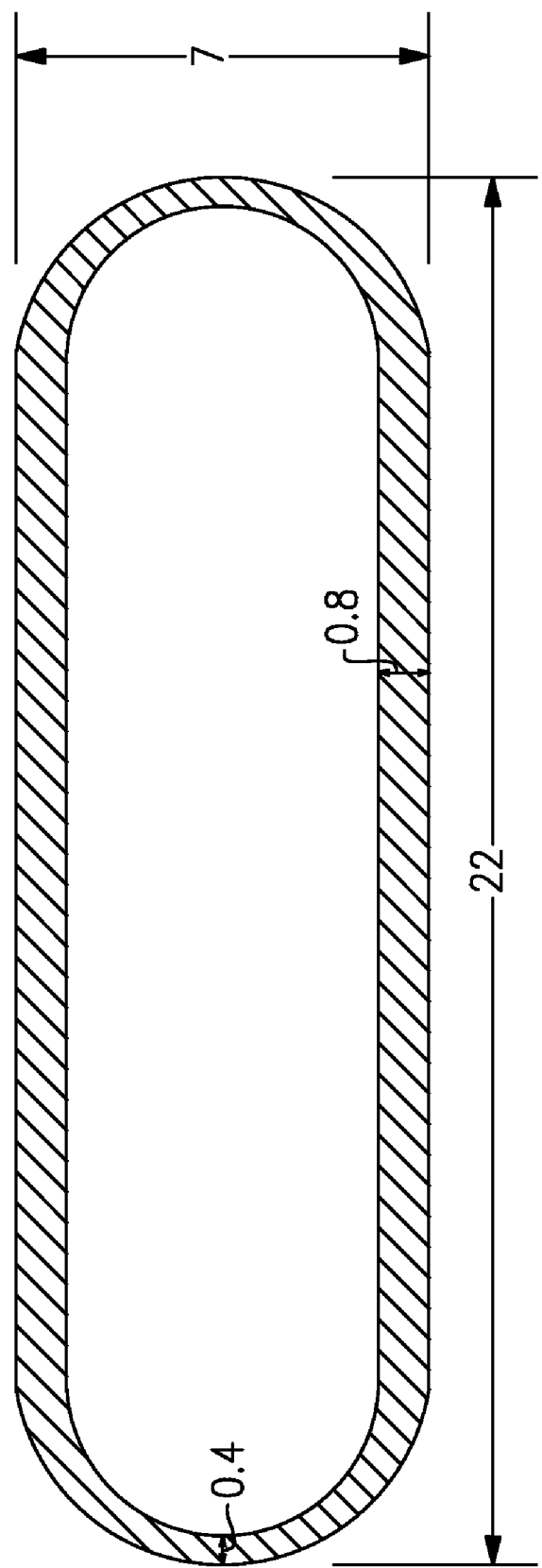

MAIN ROTOR BLADE WITH INTEGRAL CUFF

This invention was made with government support with the United States Navy under Contract No.: N00019-06-C-0081. The government therefore has certain rights in this invention.

BACKGROUND OF THE INVENTION

The present invention relates to a rotary wing aircraft main rotor blade, and more particularly to a main rotor blade with a cuff integral with the spar.

Rotary-wing aircraft rotor blades often include a composite or metallic main rotor spar of a constant chord and constant wall thickness. To attach the rotor spar to a hub assembly, a separate root end cuff is attached to an inboard section of the main rotor spar. The cuff is conventionally manufactured of a titanium forging or a composite root laminate sized to match an outer mold line of the main rotor spar. The root end cuff is attached to the main rotor spar through a multiple fastener configuration, each fastener of which must be torqued to a required standard.

Although effective, the separate root end cuff assembly and related hub componentry may result in a weight and life cycle penalty as the multiple of components are duplicated on each rotor blade assembly.

SUMMARY OF THE INVENTION

A main rotor blade assembly according to an exemplary aspect of the present invention includes: a main spar formed with an integral cuff.

A rotary wing aircraft according to an exemplary aspect of the present invention includes: a rotor hub assembly; a main spar which comprises a root section and an main section, the root section forms an integral cuff, the integral cuff having a first hub mount aperture and a second hub mount aperture; a first pin which passes through the first aperture to mount the main spar to the rotor hub assembly; and a second pin which passes through the second aperture to mount the main spar to the rotor hub assembly.

A method of mounting a main rotor blade assembly according to an exemplary aspect of the present invention includes: attaching an integral cuff directly to a rotor hub assembly.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 2A is a perspective view of a main rotor blade;

FIG. 2B is an expanded perspective view of a tip section of the rotor blade of FIG. 2A;

FIG. 2C is an expanded rear oblique perspective view of a tip section of the rotor blade of FIG. 2A;

FIG. 2D is an expanded front oblique perspective view of a tip section of the rotor blade of FIG. 2A;

FIG. 2E is an expanded top view of a tip section of the rotor blade of FIG. 2A;

FIG. 2F is an expanded front view of a tip section of the rotor blade of FIG. 2A;

FIG. 7A is a top view of the main rotor blade spar;

FIG. 7B is a front view of the main rotor blade spar;

FIG. 8A is a sectional view through a root section of the main rotor blade spar taken along line 8A-8A in FIG. 7A;

DETAILED DESCRIPTION OF THE DISCLOSED EMBODIMENT

Figure 1:
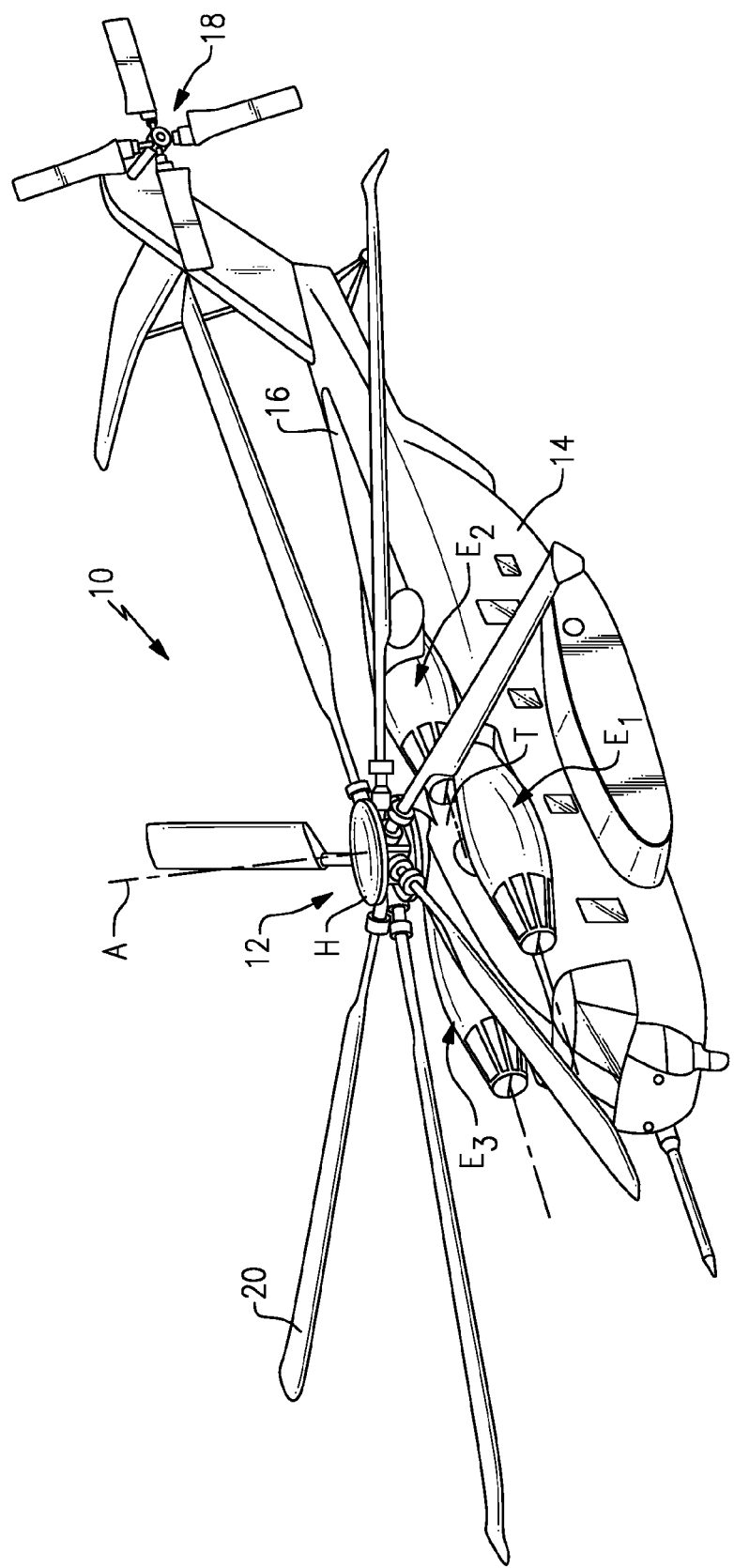
FIG. 1 is a perspective view of a rotary wing aircraft for use with the present invention.

FIG. 1 schematically illustrates a rotary-wing aircraft 10 having a main rotor system 12. The aircraft 10 includes an airframe 14 having an extending tail 16 which mounts a tail rotor system 18, such as an anti-torque system. The main rotor assembly 12 is driven about an axis of rotation A through a main gearbox (illustrated schematically at T) by one or more engines E. The main rotor system 12 includes a multiple of rotor blade assemblies 20 mounted to a rotor hub assembly H. Although a particular helicopter configuration is illustrated and described in the disclosed non-limiting embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Referring to FIG. 2A, each rotor blade assembly 20 of the rotor assembly 12 generally includes a root section 22, an intermediate section 24, a tip section 26 and a tip cap 28. Each rotor blade section 22, 24, 26, 28 may define particular airfoil geometries to particularly tailor the rotor blade aerodynamics to the velocity increase along the rotor blade span. The rotor blade tip section 26 includes an anhedral form 27 (FIG. 2B-2F), however, any angled and non-angled forms such as cathedral, gull, bent, and other non-straight forms will benefit from the present invention. The anhedral form 27 as defined herein may include a rotor blade tip section 26 which is at least partially not contained in a plane defined by the intermediate section 24.

The rotor blade sections 22-28 define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34. The distance between the leading edge 32 and the trailing edge 34 defines a main element chord length Cm.

Figure 3:
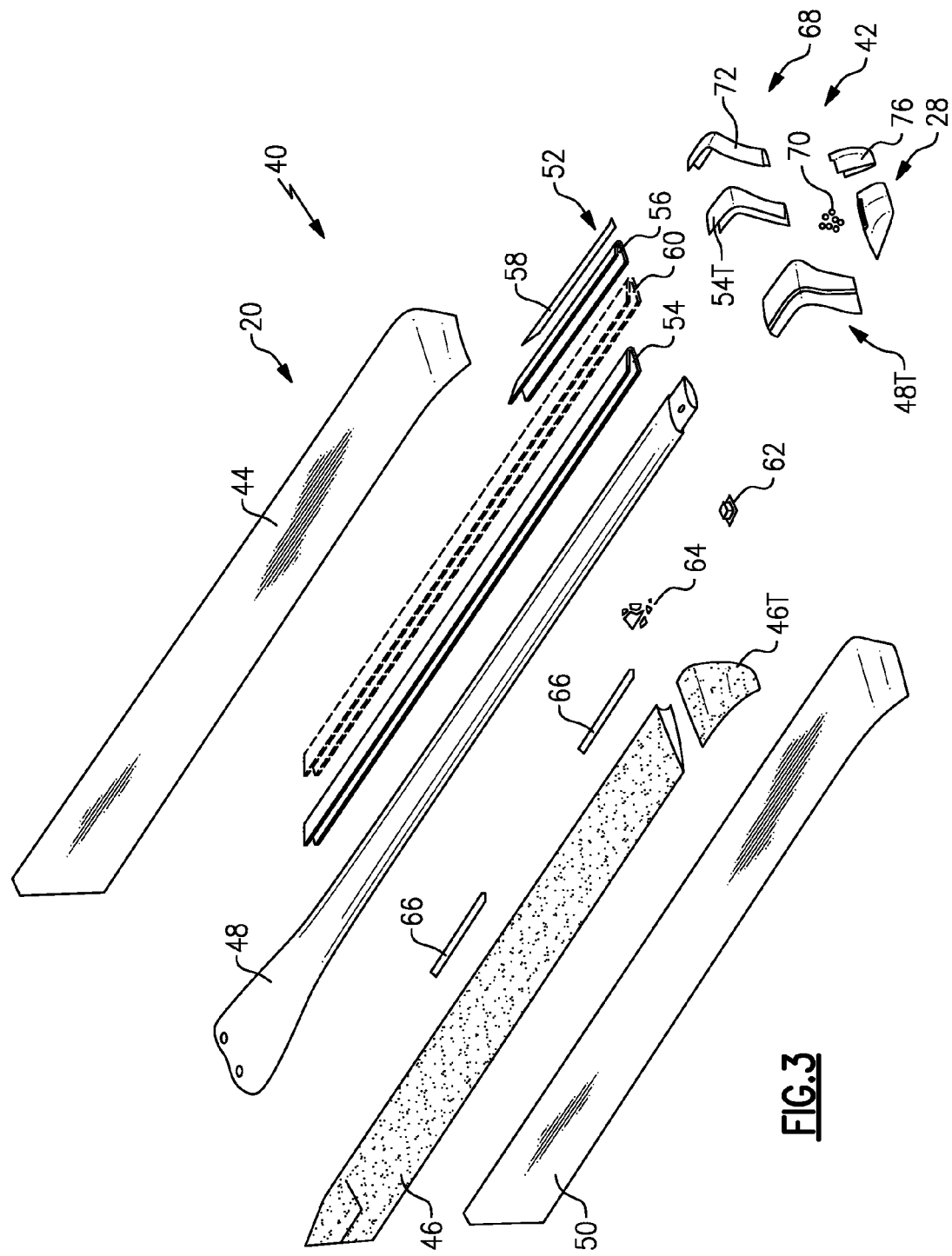
FIG. 3 is an exploded view of a main rotor blade.

Referring to FIG. 3, the rotor blade assembly 20 generally includes a main blade assembly 40 and a tip assembly 42. The main blade assembly 40 includes an upper skin 44 a main core 46, a main spar 48, a lower skin 50, and a leading edge assembly 52. The main spar 48, main core 46 and skins 44, 50 are generally referred to as a pocket assembly, the forward portion of which is closed out by the leading edge assembly 52.

The leading edge assembly 52 generally includes a main sheath laminate 54 upon which is mounted a wear-resistant material such as a titanium erosion strip 56 and a nickel erosion strip 58 to provide abrasion protection. Alternatively, the sheath laminate 54 may include a single erosion strip 60 manufactured of AM355 which replaces the titanium erosion strip 56 and the nickel erosion strip 58. It should be understood that a variety of a wear-resistant materials may alternatively or additionally be provided for the leading edge assembly 52. Additional structures such as weight cups 62, blade tie down fastener structures 64 and trim tab systems 66 may also be provided, further details of which need not be further elaborated herein.

Figure 4:
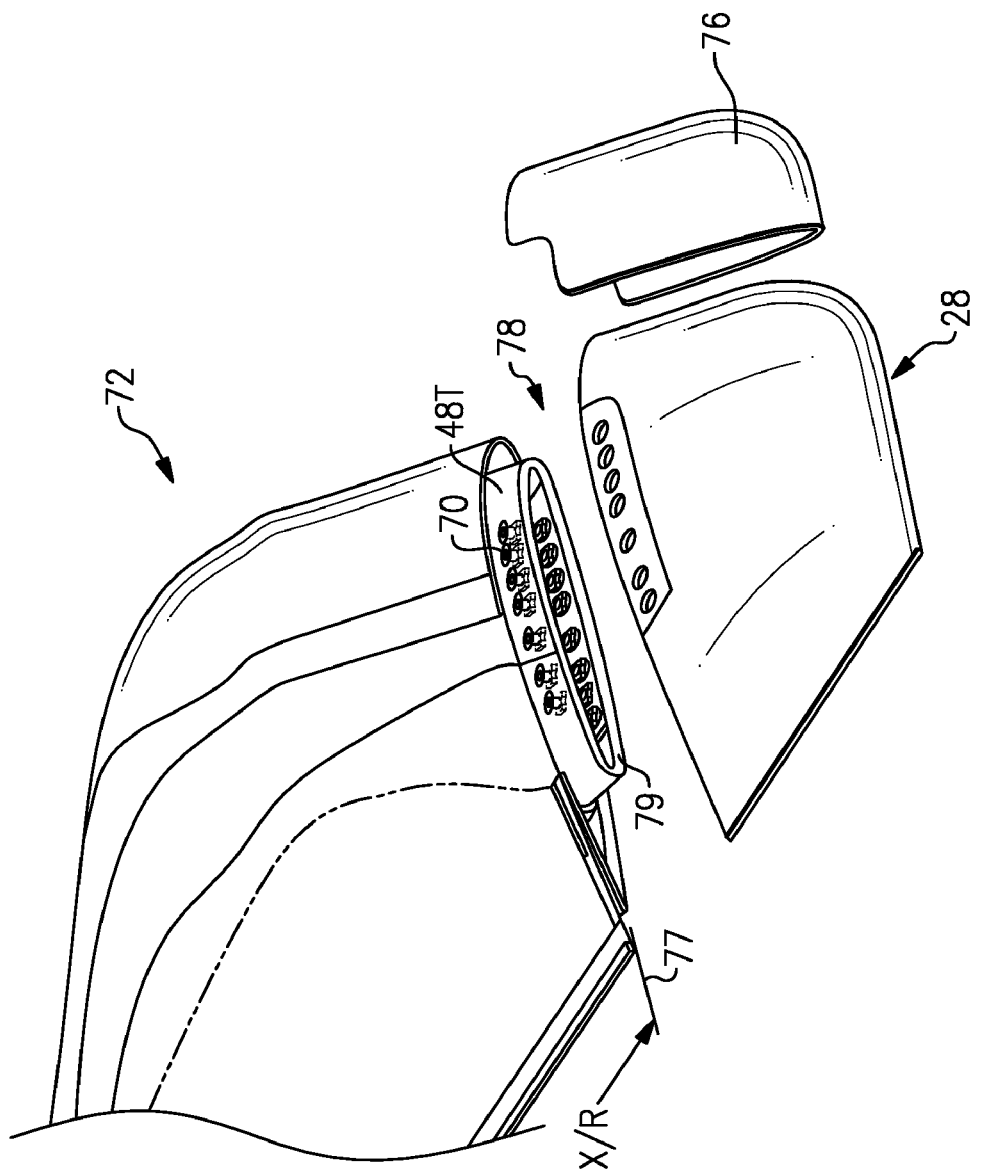
FIG. 4 is an exploded view of a removable tip cap for a main rotor blade.

The tip assembly 42 generally includes a tip spar 48T, a tip core 46T, a tip leading edge assembly 68 and the tip cap 28. The tip cap 28 may be removably attached to the tip spar 48T though hardware 70 in a cap interface 78 (FIG. 4) to close-out the end of the tip assembly 42. The cap interface 78 may be defined at an inboard radial station 77 of approximately ninety eight percent (98% x/R) and end at an outboard radial station 79 which defines the distal end of the tip spar 48T, however other locations may alternatively be provided. It should be understood that other overlap lengths, locations and interfaces may alternatively or additionally be provided.

The tip leading edge assembly 68 may also include a splice cap laminate 54T and a tip erosion strip 72 to provide abrasion protection. The splice cap laminate 54T abuts the main sheath laminate 54 at the inboard radial station 82. The tip erosion strip 72 may overlap the inboard radial station 82 and extend to the outboard radial station 84 to protect the interface 78. The tip cap 28 also includes an erosion cap 76 which may overlap the tip cap interface 77 between the tip assembly 42 and the tip cap 28. The tip erosion strip 72 and the erosion cap 76 may include AM355, titanium, nickel, or a variety of other wear-resistant materials or combinations thereof.

Figure 5A:
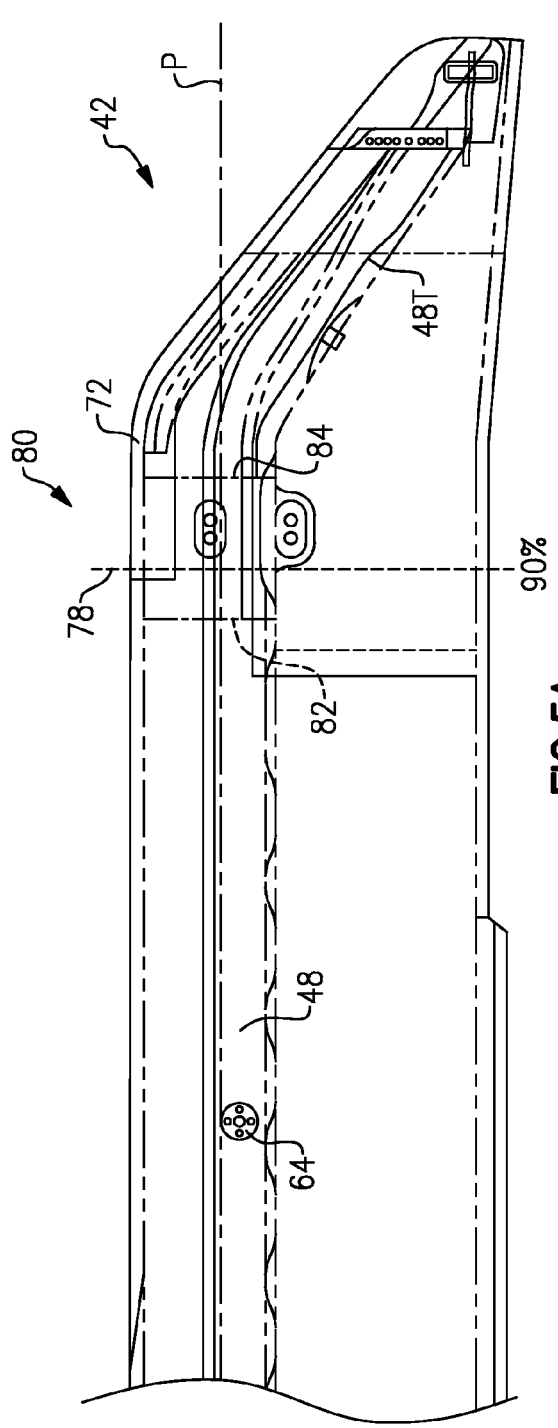
FIG. 5A is a plan view of a tip section of a main rotor blade.
Figure 5B:
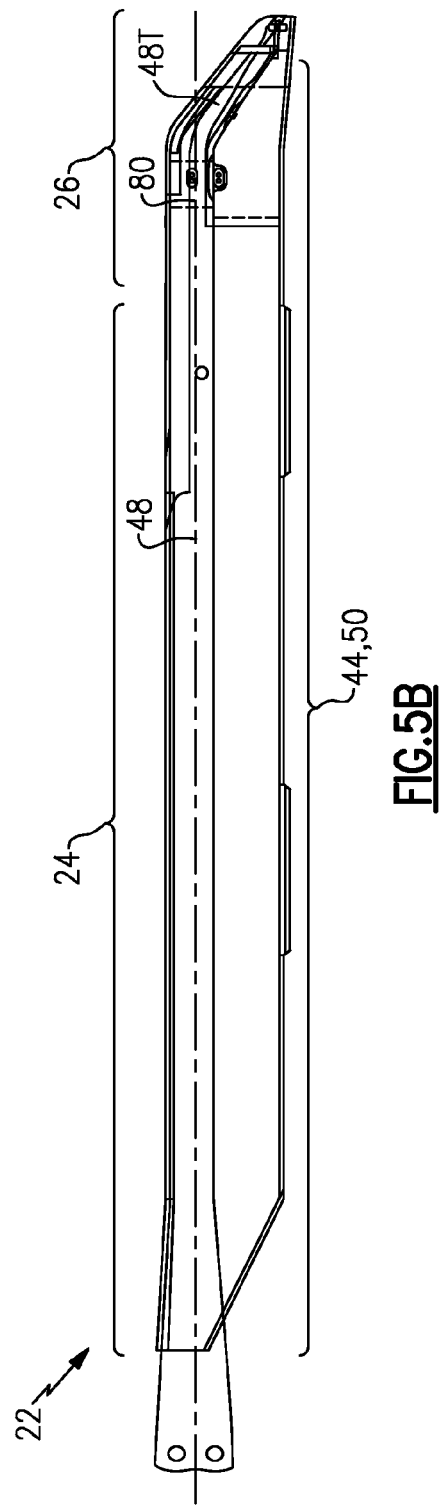
FIG. 5B is a top plan view of a main rotor blade.

Referring to FIG. 5A, the main spar 48 and the tip spar 48T extend along the length of the blade sections 22-26. The main spar 48 and the tip spar 48T are structural members manufactured of a high strength non-metallic composite material and/or high strength metallic material such as titanium. The tip spar 48T is attached to the main spar 48 in a male-female overlap relationship 80 between the inboard radial station 82 and the outboard radial station 84. The upper skin 44 and the lower skin 50 extend outboard of the overlap relationship 80 which allows a contiguous composite skin laminate from the root section 22 through the tip section 26 to define the aerodynamic shape of the blade (FIG. 5B). That is, no separate main skins and tip skins are utilized.

In one non-limiting embodiment, the upper skin 44 and the lower skin 50 extend from the root section 22 to the inboard radial station 77 of the cap interface 78 of the tip spar 48T which abuts the tip cap 28. In other words, the upper skin 44 and the lower skin 50 extend past the overlap relationship 80. Lift properties, for example, are significantly increased over conventional rotor blades with separate tip skins due in part to the increased strength of the one-piece composite skin laminate. Should a blade strike occur, the tip assembly 42 may still separate from the main blade assembly 40 at the overlap relationship 80 such that only the tip spar 48T and related tip assembly 42 components may break away which thereby allows the main blade 20 defined by the main spar 48 to remain flightworthy, albeit with reduced lift capabilities.

The tip spar 48T and the tip core 46T define the anhedral form or other angled forms such as cathedral, gull, bent, and others. Furthermore, the tip core 46T may be hot formed to specifically include the anhedral form as well as be of similar or different weight per cubic foot (pcf) as compared to the main core 46 to provide particular lift and strength properties. The anhedral form may be located at a radial station of approximately ninety six percent (96% x/R). It should be understood that the anhedral form or other angled and non-angled forms may be located at other radial stations.

An end section ST of the tip spar 48T is bonded over an end section SM of the main spar 48 (FIG. 5C) to define the overlap relationship 80. An adhesive material, such as epoxy film adhesive, is one example of a bonding agent. The main spar end section SM may be of a reduced perimeter such that a flush outer mold line (OML) spar surface is formed therebetween. That is, the end section SM of the main spar 48 defines a jogged or stepped area to receive the end section ST of the tip spar 48T. The overlap relationship 80 may begin at an inboard radial station 82 of approximately eighty nine percent (89% x/R) and end at an outboard radial station 84 of approximately ninety two percent (92% x/R). It should be understood that other overlap length, locations and interfaces may alternatively or additionally be provided.

Figure 5C:
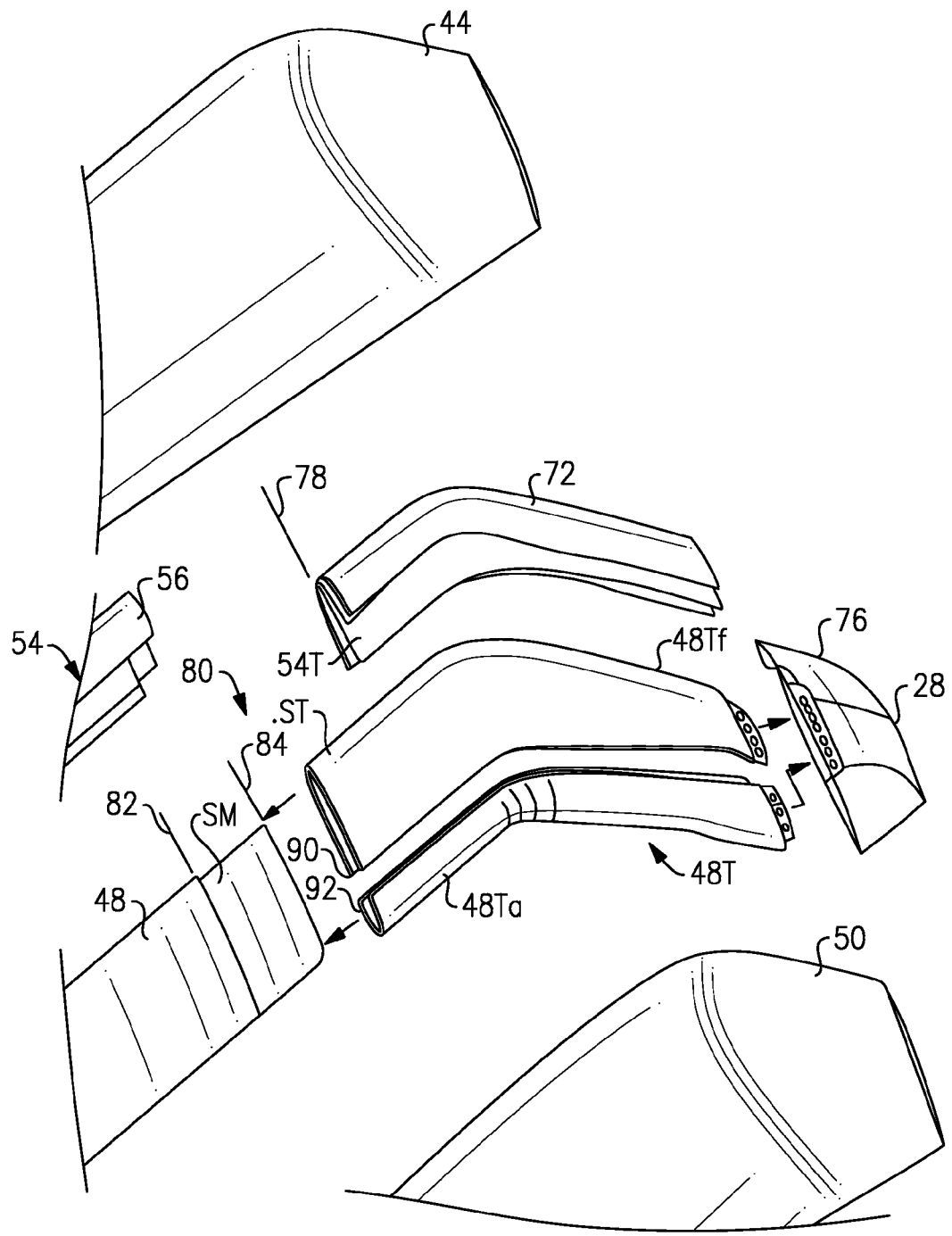
FIG. 5C is an exploded view of a tip section of the main rotor blade.
Figure 5D:
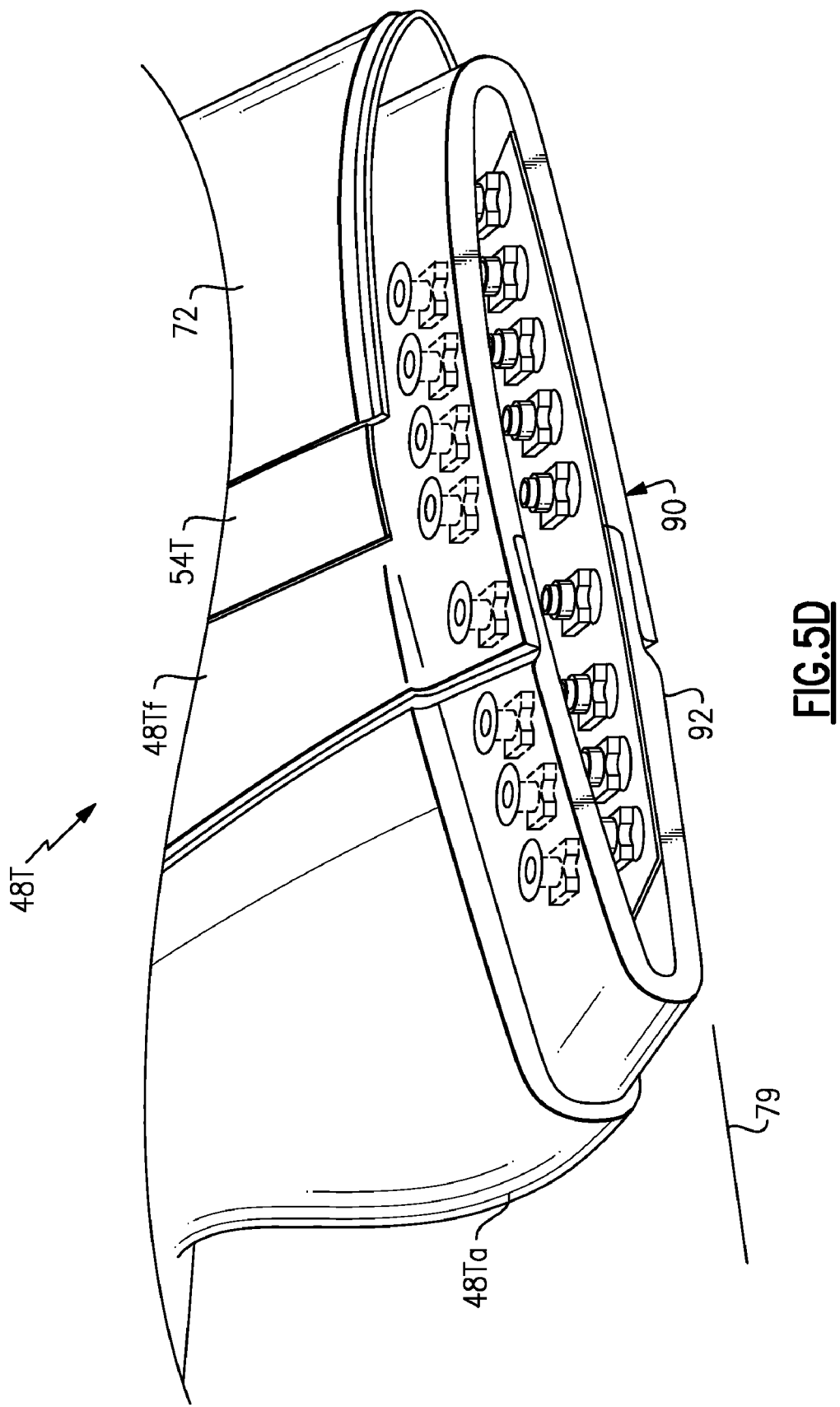
FIG. 5D is an expanded view of a distal end of a tip spar assembly without a tip cap mounted thereto.

Referring to FIG. 5C, the tip spar 48T may include a forward tip spar section 48Tf and an aft tip spar section 48Ta. The forward tip spar section 48Tf includes an open aft section 90 with a stepped inner mold line to receive the open aft section 90 of the forward tip spar section 48Tf of FIG. 5D. The aft tip spar section 48Ta includes an open forward section 92 with a stepped outer mold line. It should be understood that other overlap length, locations and interfaces may alternatively or additionally be provided.

Figure 5E:
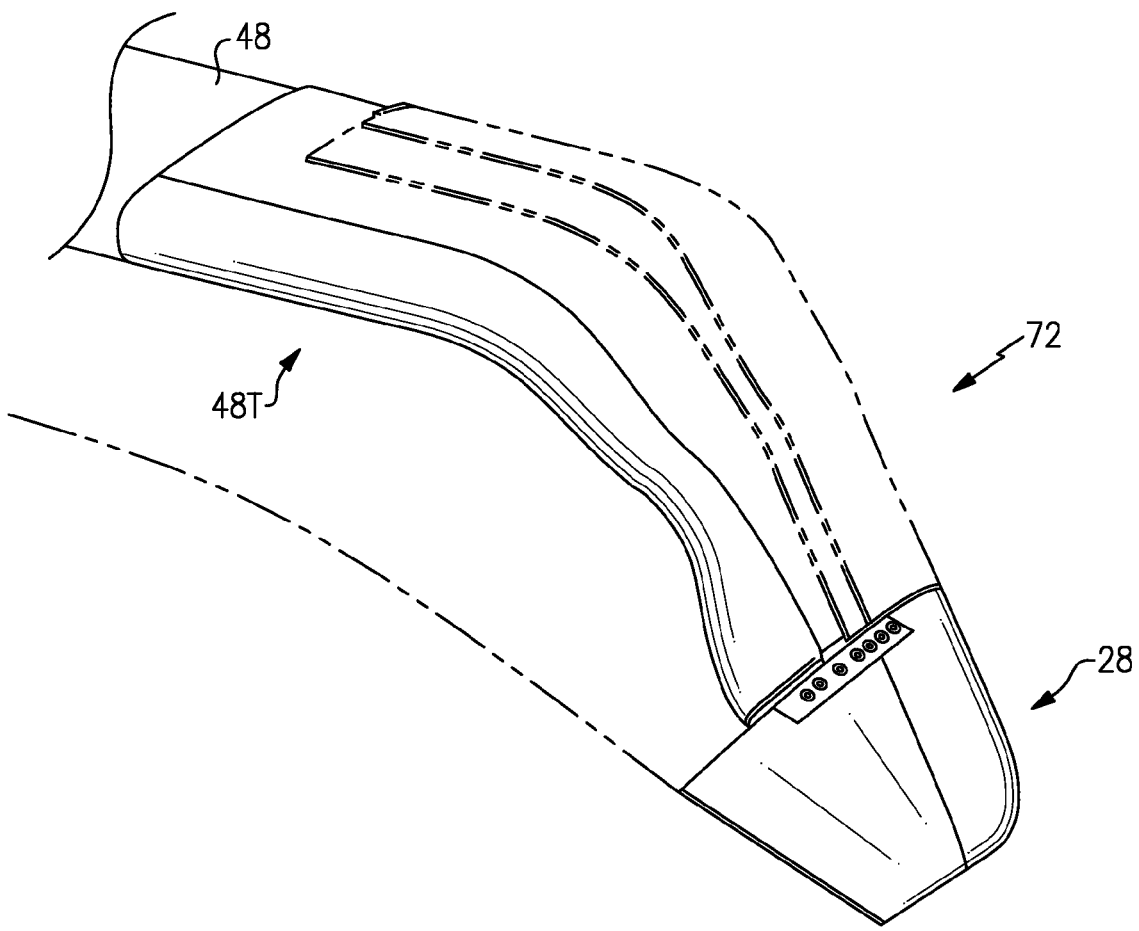
FIG. 5E is an expanded section view of a tip spar bonded to a main blade spar with a tip cap installed to the tip spar.
Figure 5F:
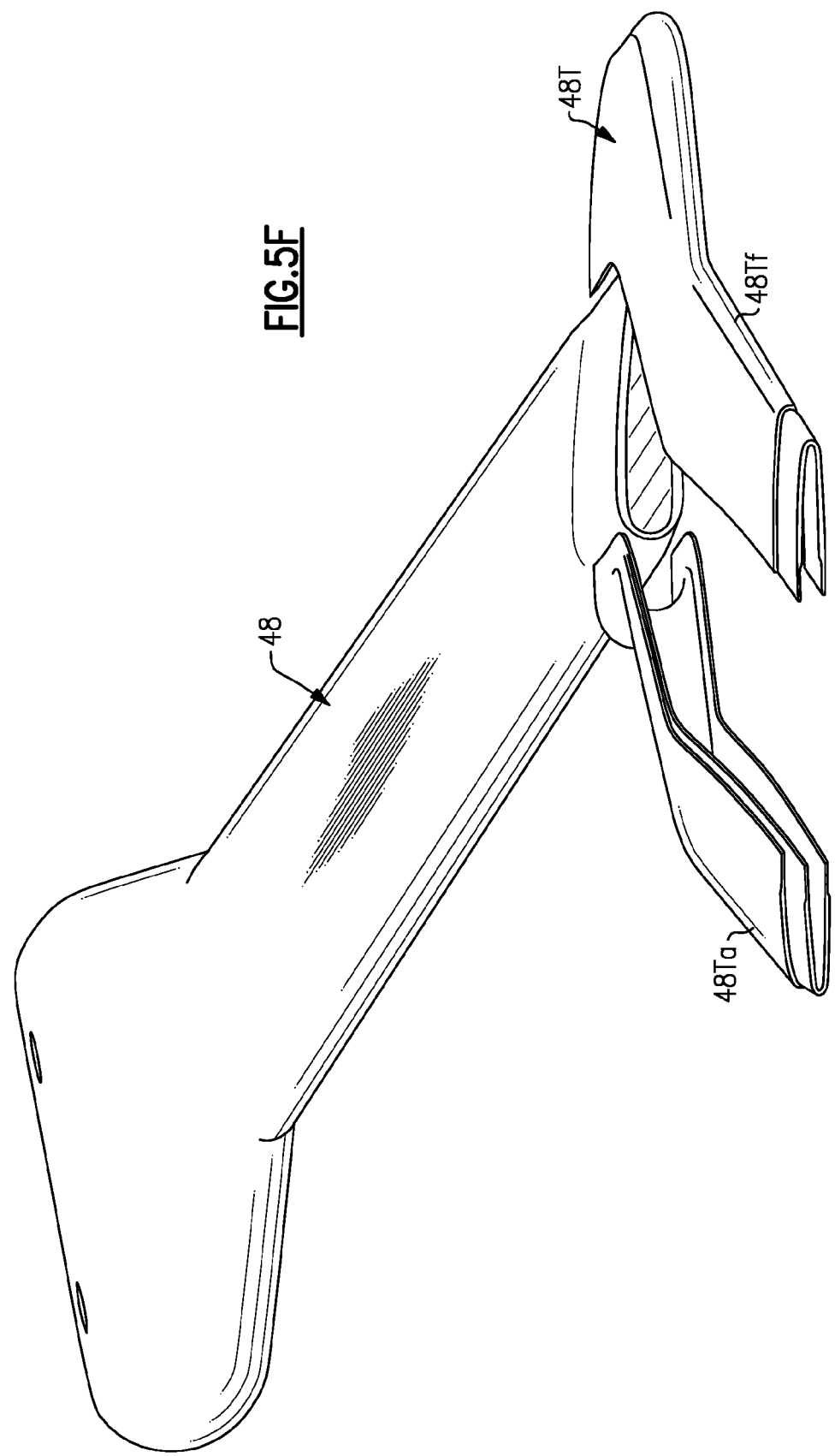
FIG. 5F is an exploded perspective view of a main spar with a forward tip spar section and an aft tip spar section.
Figure 5G:
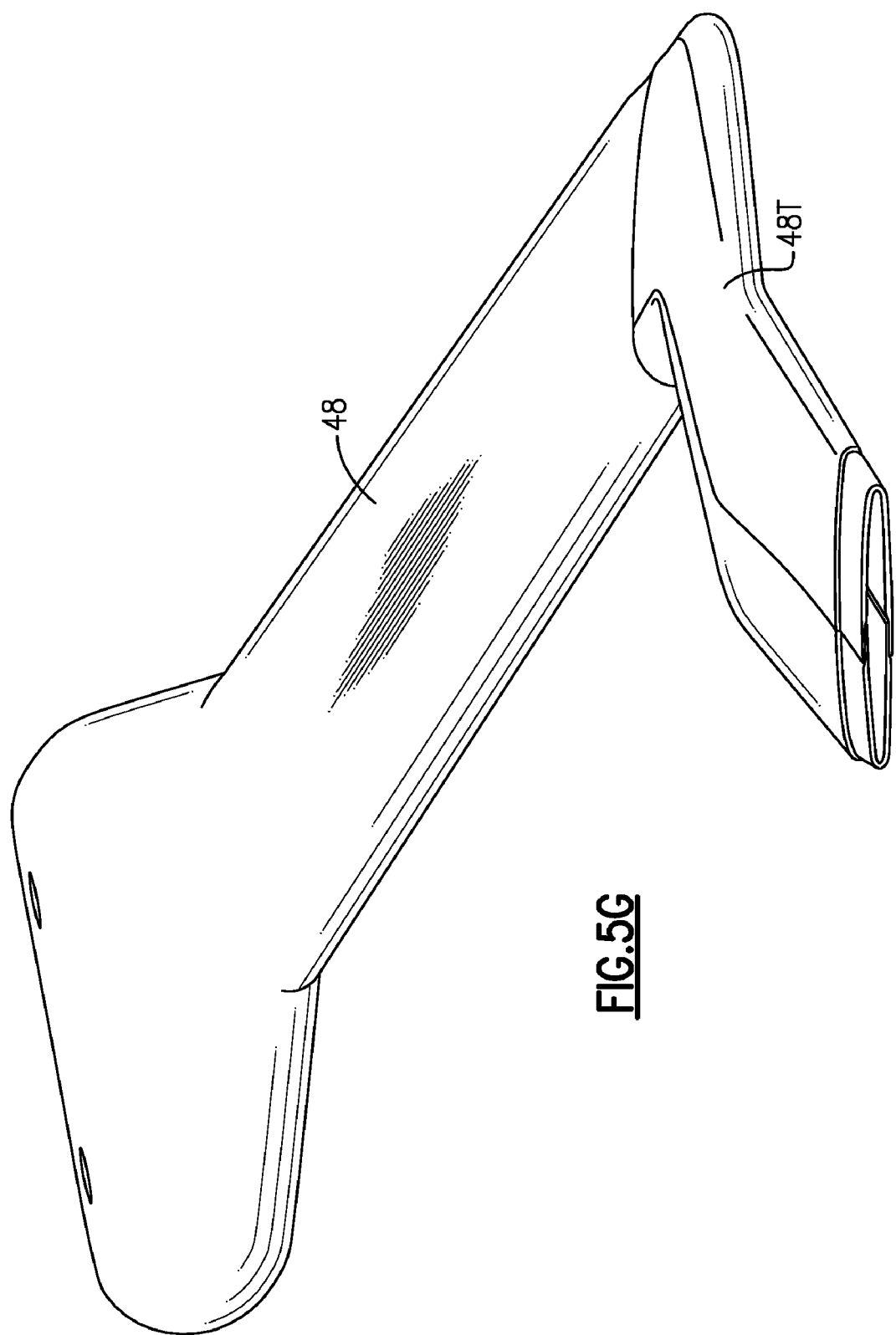
FIG. 5G is an assembled view of the main spar, forward tip spar section and aft tip spar section.

The forward and aft split arrangement facilitates assembly of the forward tip spar section 48Tf to the aft tip spar section 48Ta such that the inboard end section ST of the tip spar 48T is receivable over the outboard end section SM of the main spar 48 (FIG. 5E). The forward tip spar section 48Tf and an aft tip spar section 48Ta are thereby assembled together over the outboard end section SM of the main spar 48 (FIG. 5F) to attach the tip spar 48T to the main spar 48 (FIG. 5G).

Figure 5H:
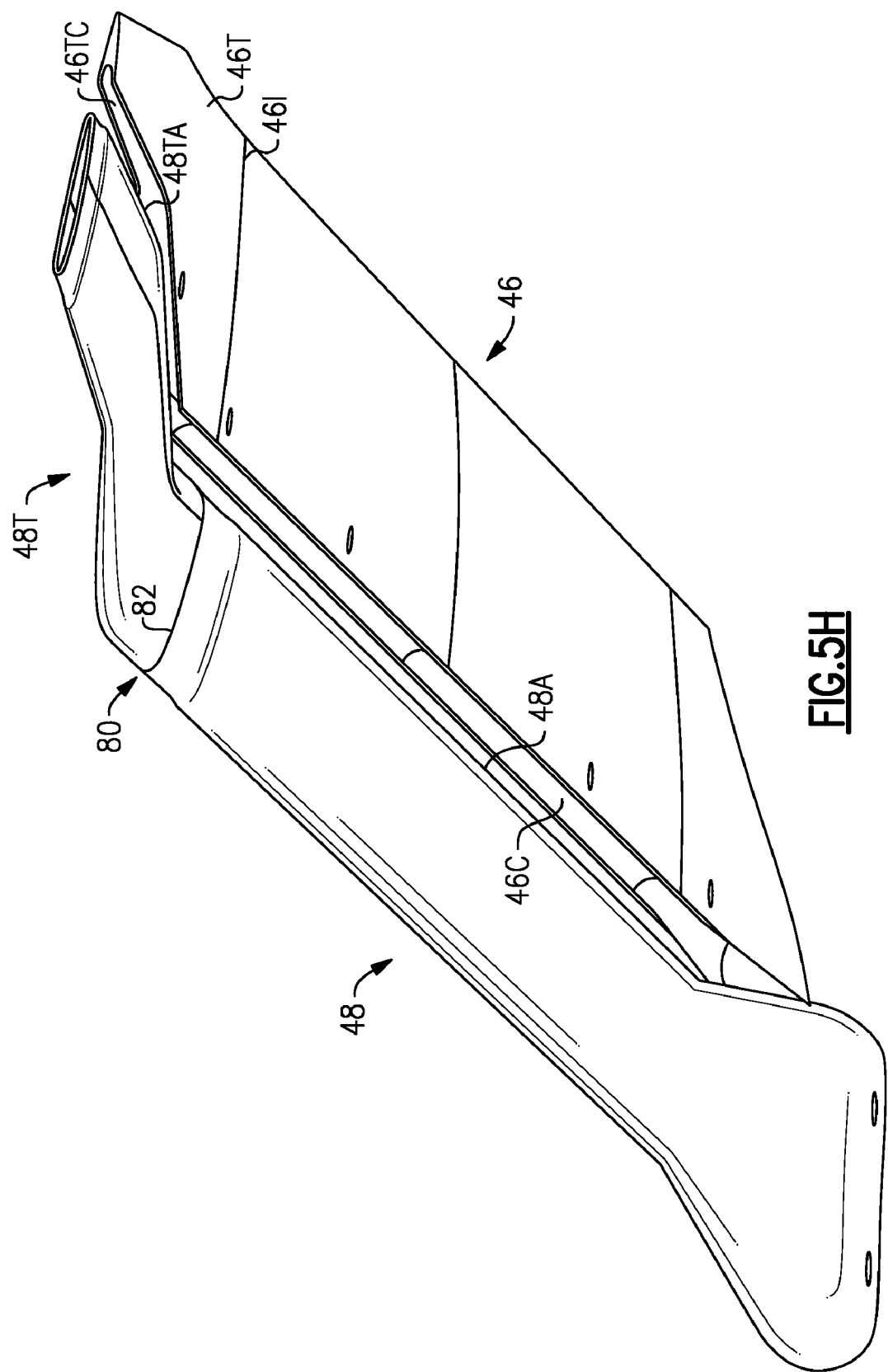
FIG. 5H is an exploded view of an assembled main spar and tip spar with a main core and tip core.
Figure 5I:
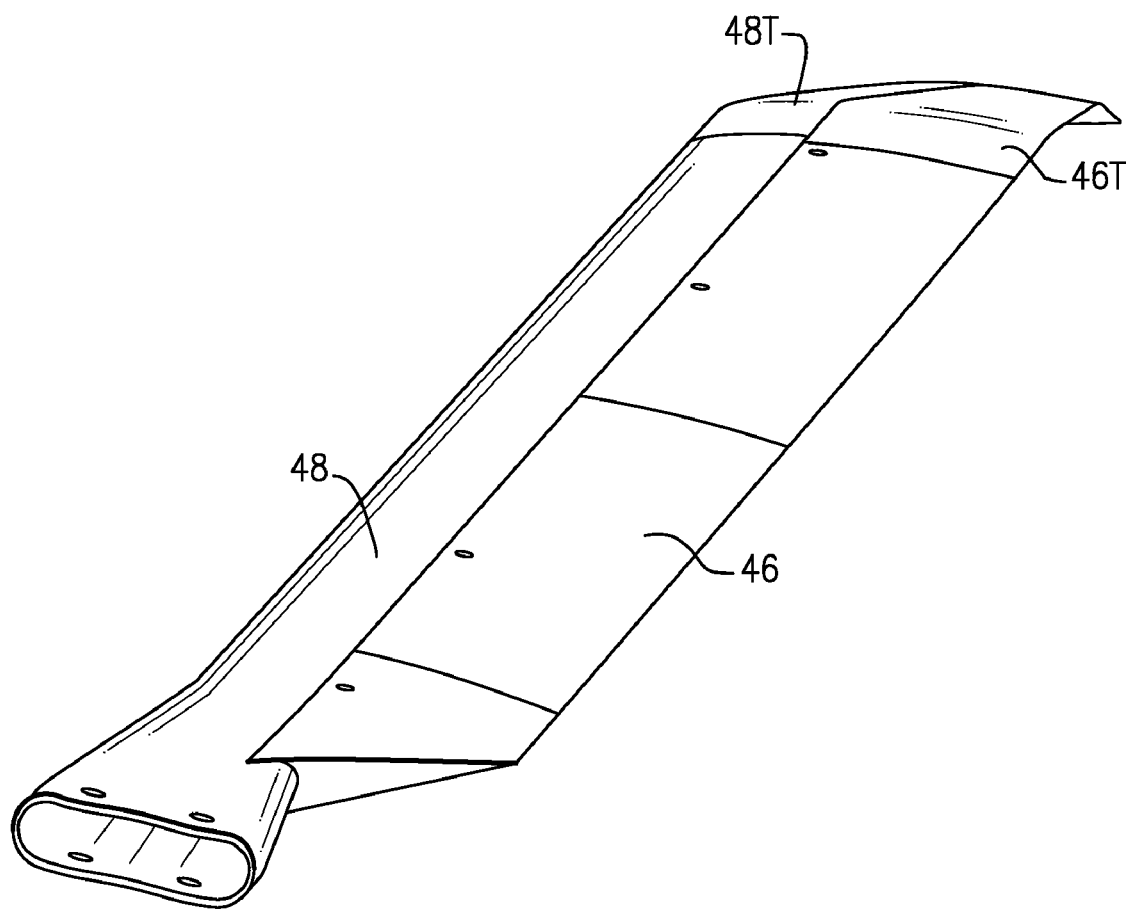
FIG. 5I is a perspective view of an assembled main spar and tip spar with the main core and tip core.
Figure 5J:
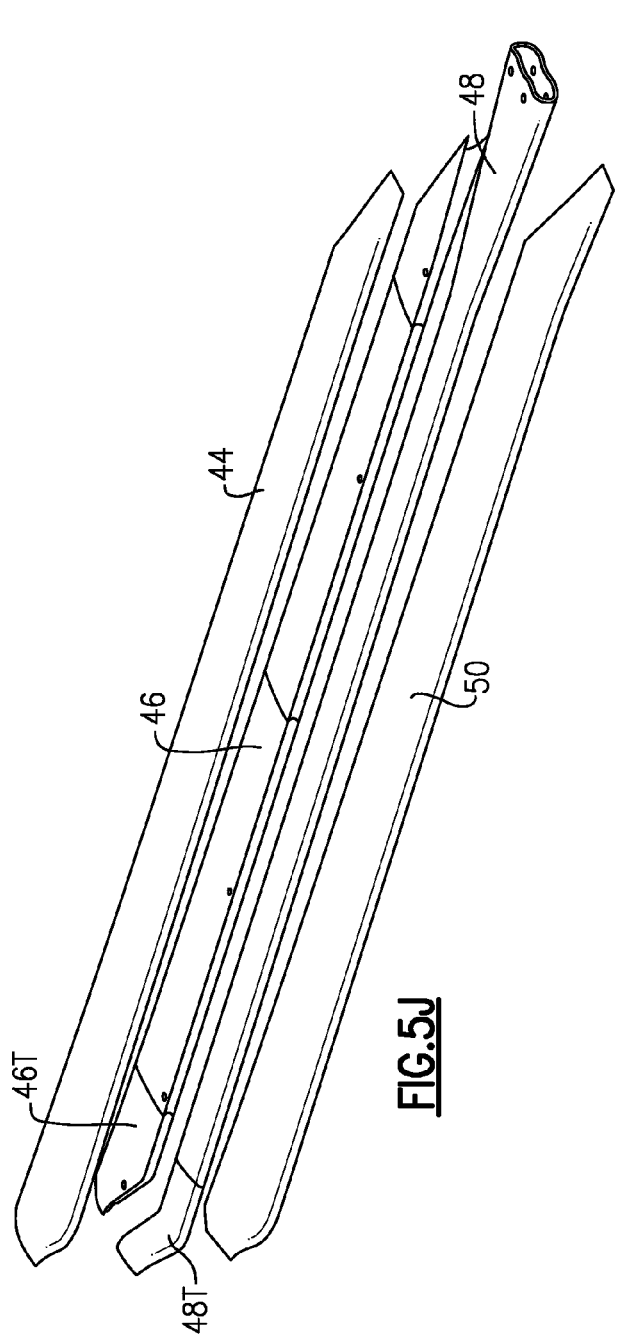
FIG. 5J is an exploded view of the main rotor blade assembly components which include a non-straight tip form.

Referring to FIG. 5H, once the main spar 48 is assembled to the tip spar 48T the main core 46 and the tip core 46T are respectively attached thereto. A core interface 46I between the main core 46 and the tip core 46T is offset inboard from the inboard radial station 82 of the overlap relationship 80. The main core 46 and the tip core 46T include a respective leading edge contour 46c and 46Tc which generally match a trailing edge 48A of the main spar 48 and a trailing edge 48TA of the tip spar 48T to provide an overlapped interface (FIG. 5I) which define an outer contour to receive the upper skin 44 and the lower skin 50 (FIG. 5J).

Figure 5K:
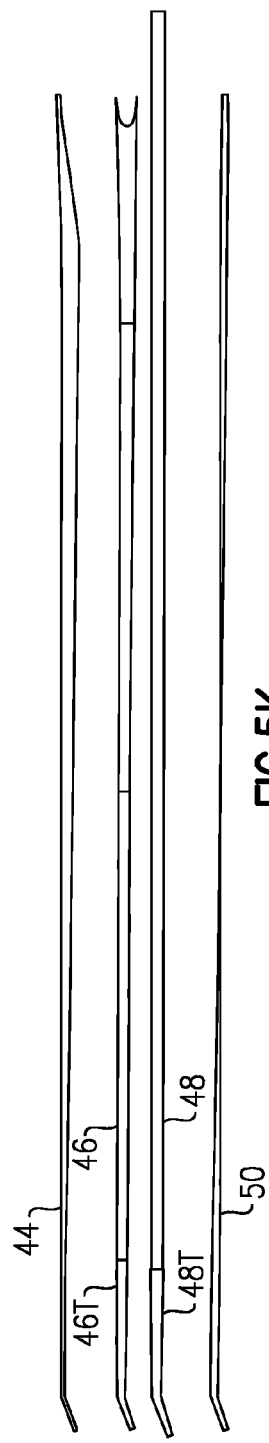
FIG. 5K is a front exploded view of the main rotor blade assembly components which include a non-straight tip form.

The rotor blade anhedral is integrated into the upper skin 44, the tip core 46T, the tip spar 48T and the lower skin 50 (FIG. 5K). That is, the angled form is directly formed into the upper skin 44, the tip core 46T, the tip spar 48T, and the lower skin 50 to provide the tip section 26 with increased strength and lift properties. Sweep is also integrated into the tip section 26.

Figure 6:
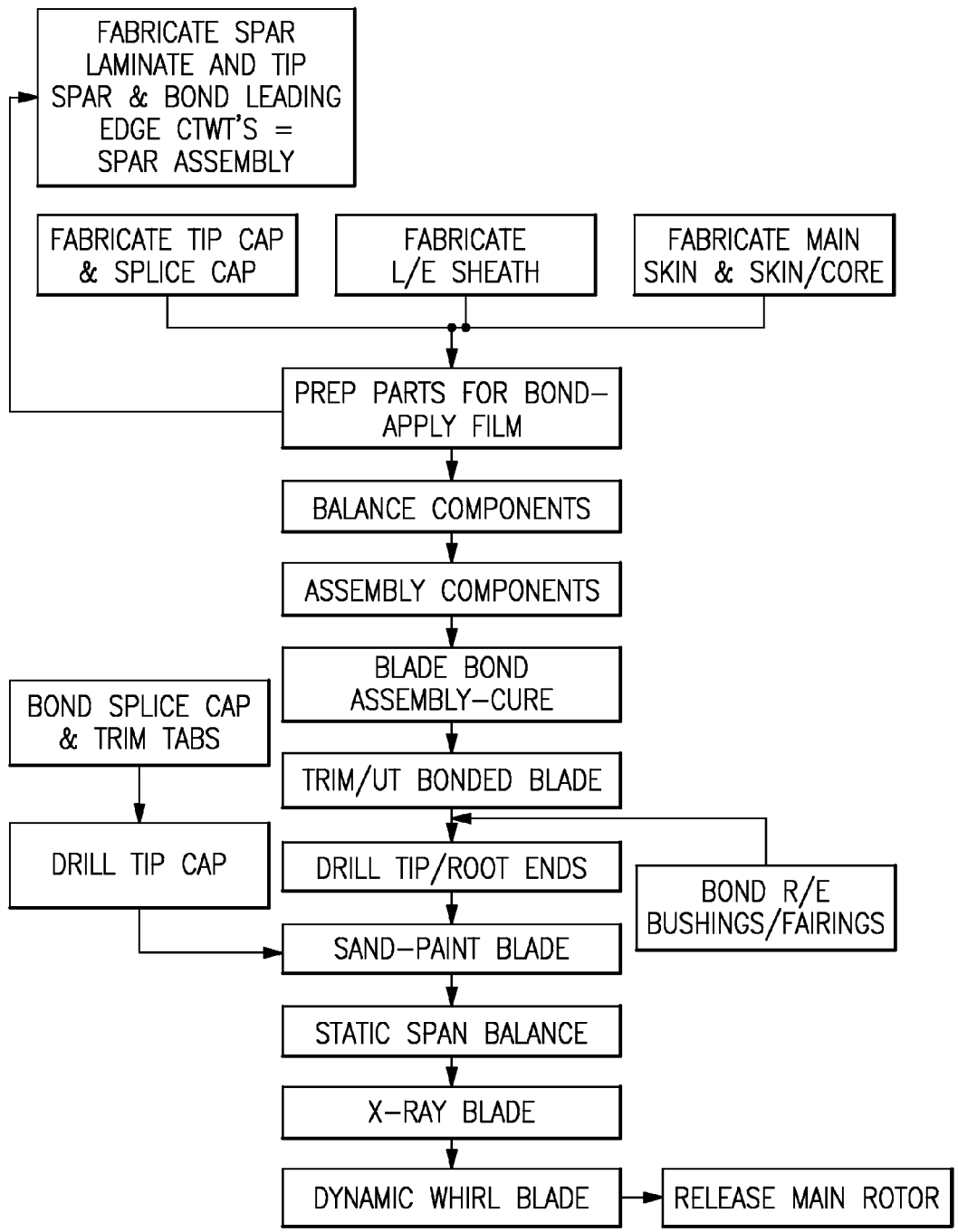
FIG. 6 is a chart illustrating one manufacturing plan of a main rotor blade in accordance with one non-limiting embodiment of the present invention.

Assembly and manufacture of the main rotor blade assembly 20 may generally follow the manufacturing plan as schematically illustrated in FIG. 6.

Figure 8B:
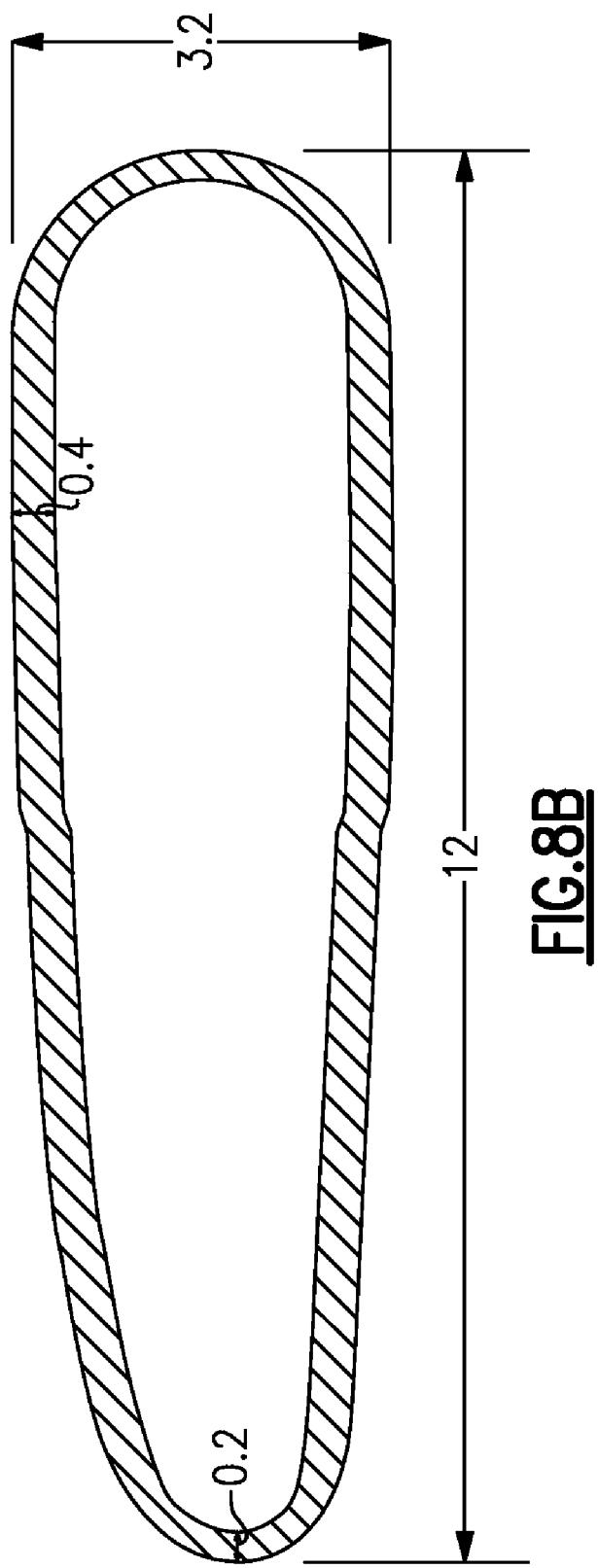
FIG. 8B is a sectional view through a main section of the main rotor blade spar taken along line 8B-8B in FIG. 7A.
Figure 8C:
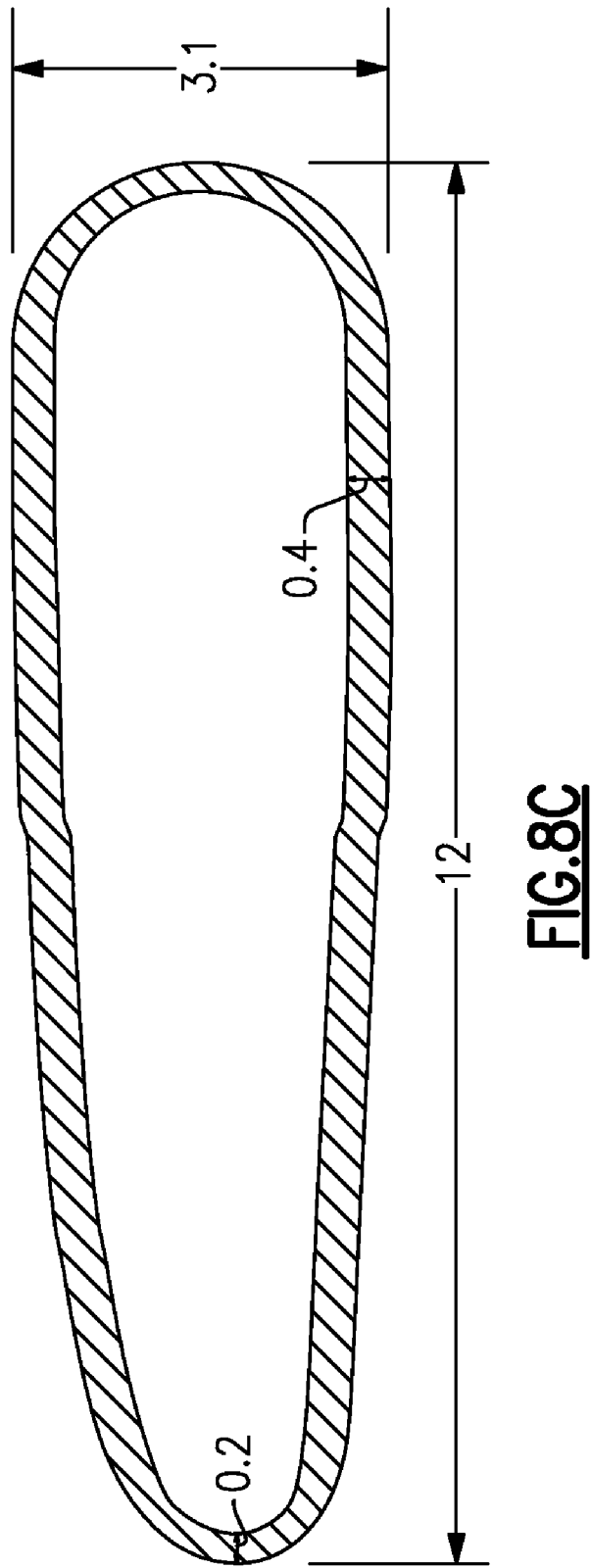
FIG. 8C is a sectional view through an outboard section of the main rotor blade spar taken along line 8C-8C in FIG. 7A.
Figure 8D:
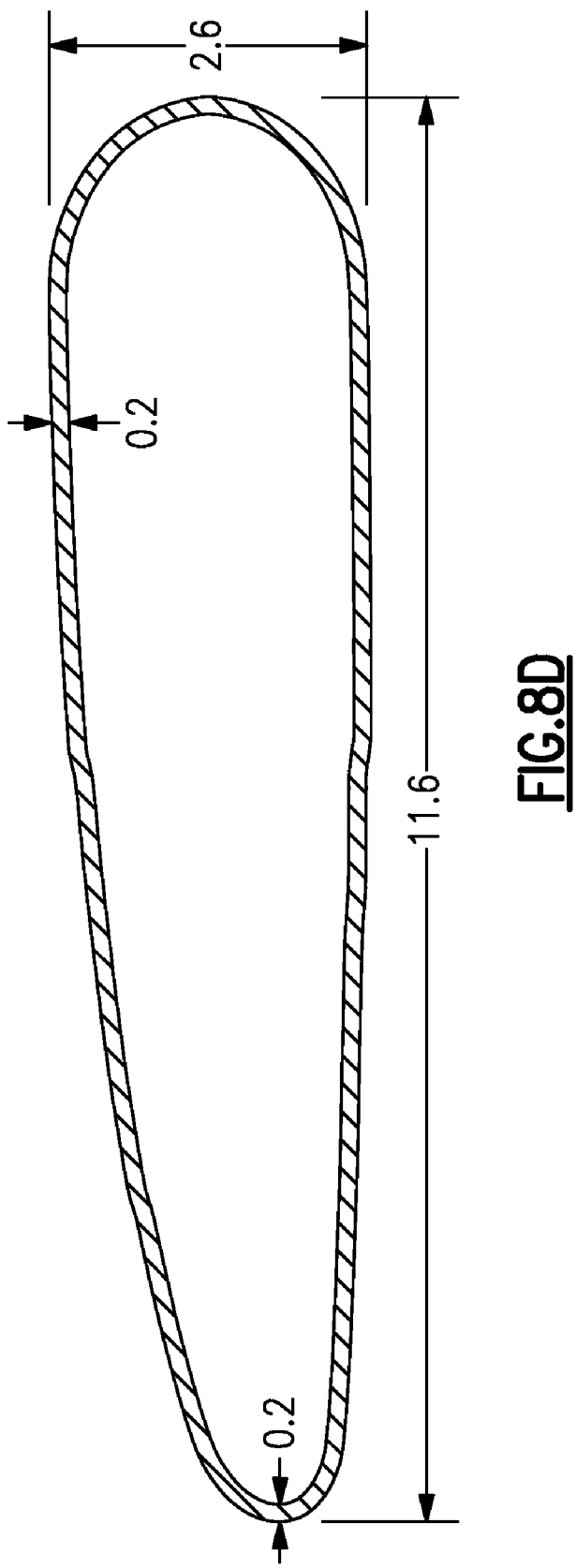
FIG. 8D is a sectional view through a tip section of the main rotor blade spar taken along line 8D-8D in FIG. 7A.
Figures 9A, 9B:
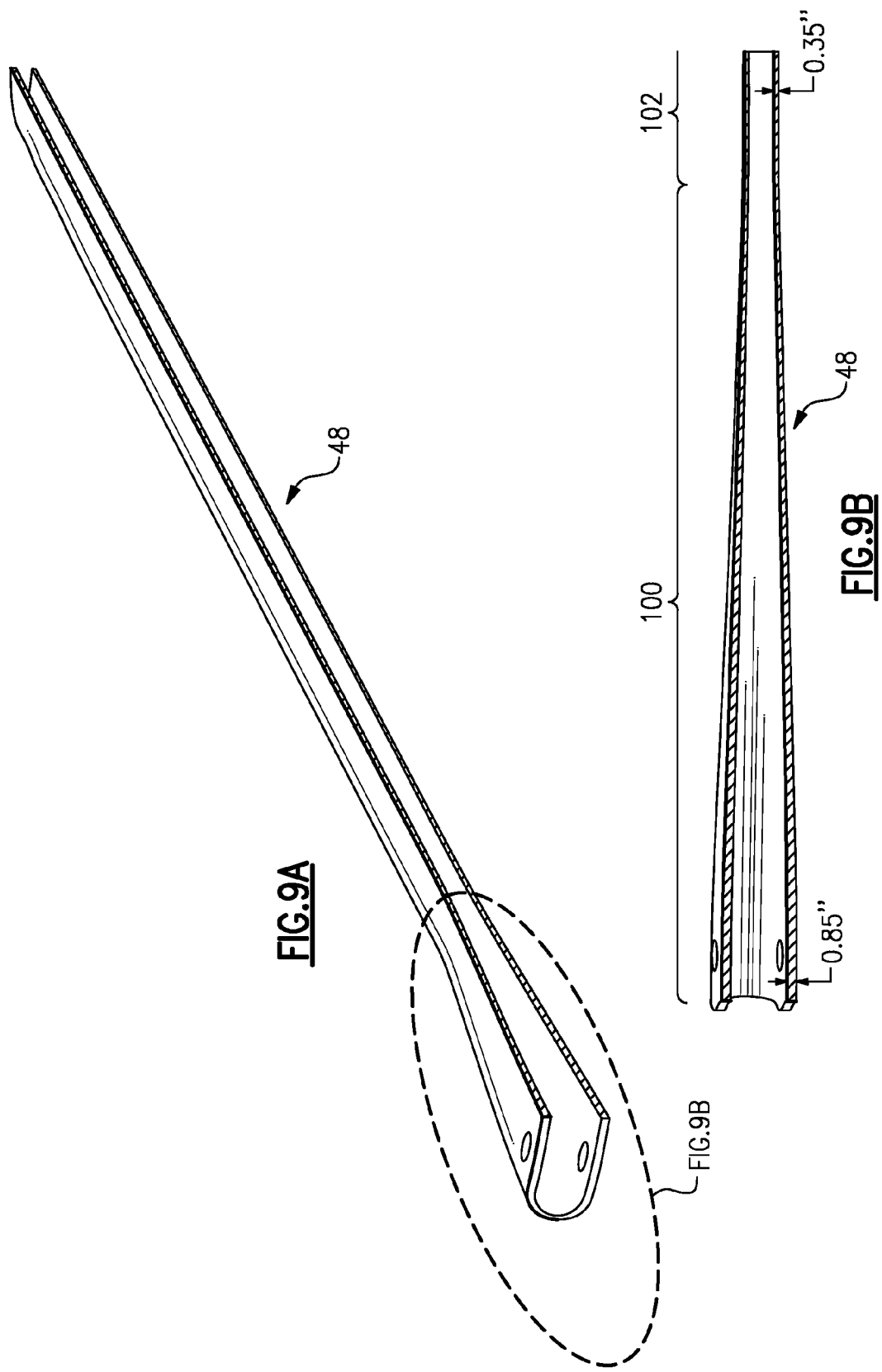
FIG. 9A is a longitudinal sectional view through the main rotor blade spar.
FIG. 9B is an expanded sectional view of an inboard section of the main rotor blade spar of FIG. 9A.
Figure 10A:
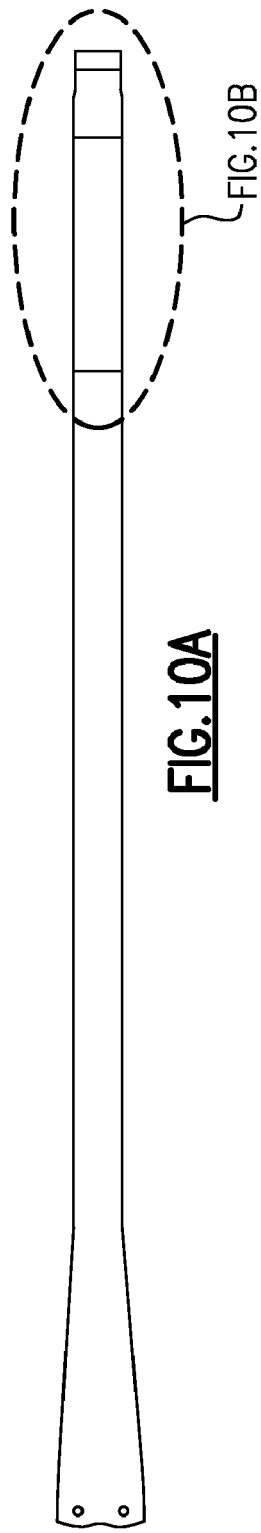
FIG. 10A is a top view of the main rotor blade spar.
Figure 10B:
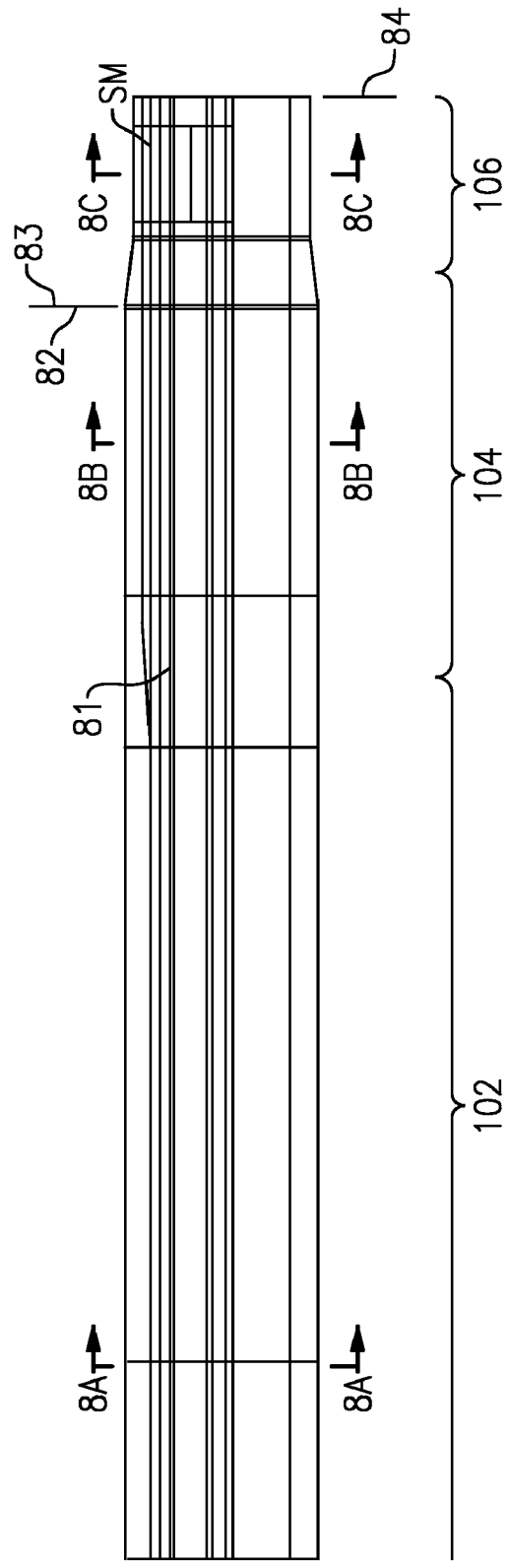
FIG. 10B is an expanded top view of an outboard section of the main rotor blade spar of FIG. 10A.

Referring to FIGS. 7A and 7B, the main spar 48 generally includes a root section 100, a main section 102, an outboard section 104 and a tip section 106. The root section 100 is formed as an integral cuff 108 which defines an increased root wall thickness (FIG. 8A) relative a main wall thickness (FIG. 8B) within the main section 102, the outboard wall thickness (FIG. 8C) within the outboard section 104 and a tip wall thickness (FIG. 8D) within the tip section 106. In one non-limiting embodiment, the root wall thickness is twice as thick as the main wall thickness (also illustrated in FIGS. 9A and 9B). The root wall thickness tapers into the main wall thickness as the root section 100 tapers chord-wise and thickness-wise. The main section 102 (FIG. 8B) shape and chord-wise dimensions are generally equivalent to the outboard section 104 (FIG. 8C) which has a slightly decreased thickness with a transition area taper section 81 therebetween. The transition area taper section 81 provides for the airfoil shape in the main section 102 to the outboard section 104. The tip wall thickness (FIG. 8D) within the tip section 106 tapers at a taper section 83 relative to the outboard section 104 (also illustrated in FIGS. 10A and 10B) to define the overlap relationship 80 which may begin at the inboard radial station 82 of approximately eighty nine percent (89% x/R) and end at an outboard radial station 84 which is defined by the distal end of the main spar 48.

Figure 11:
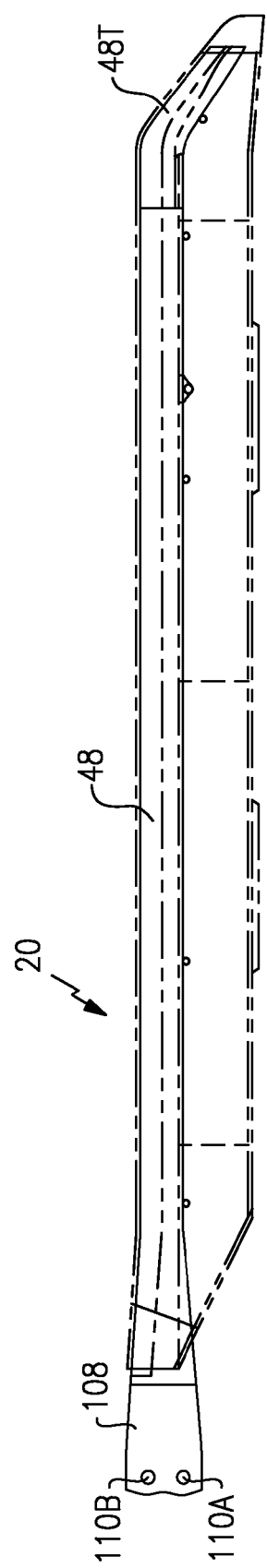
FIG. 11 is a top view of the main rotor blade assembly.
Figure 12A:
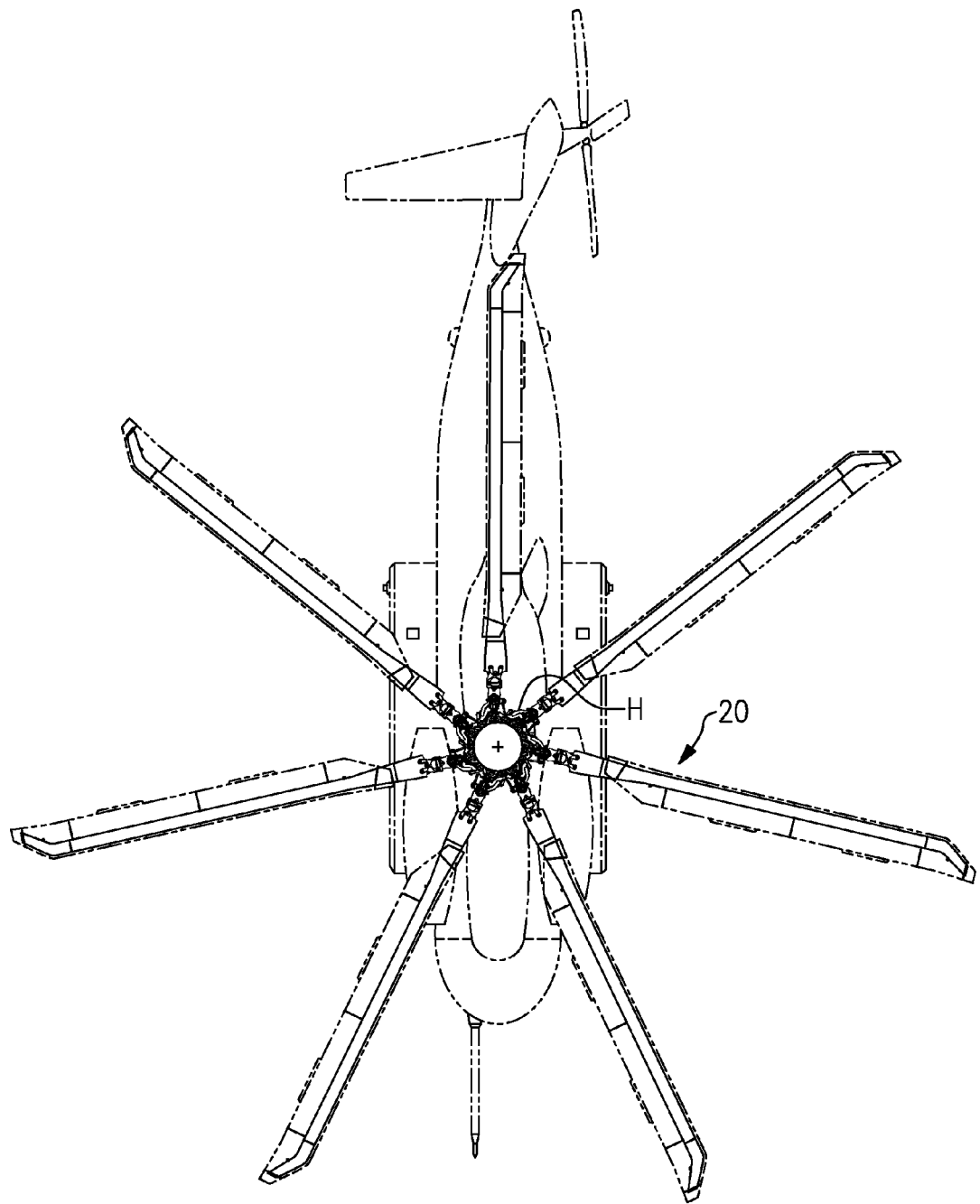
FIG. 12A is a top view of a main rotor system for a rotary wing aircraft.

Referring to FIG. 11, the integral cuff 108 of the root section 100 of each rotor blade assembly 20 includes a first aperture 110A and a second aperture 110B such that each rotor blade assembly 20 is mounted directly to the rotor hub assembly H (FIG. 12A).

Figure 12B:
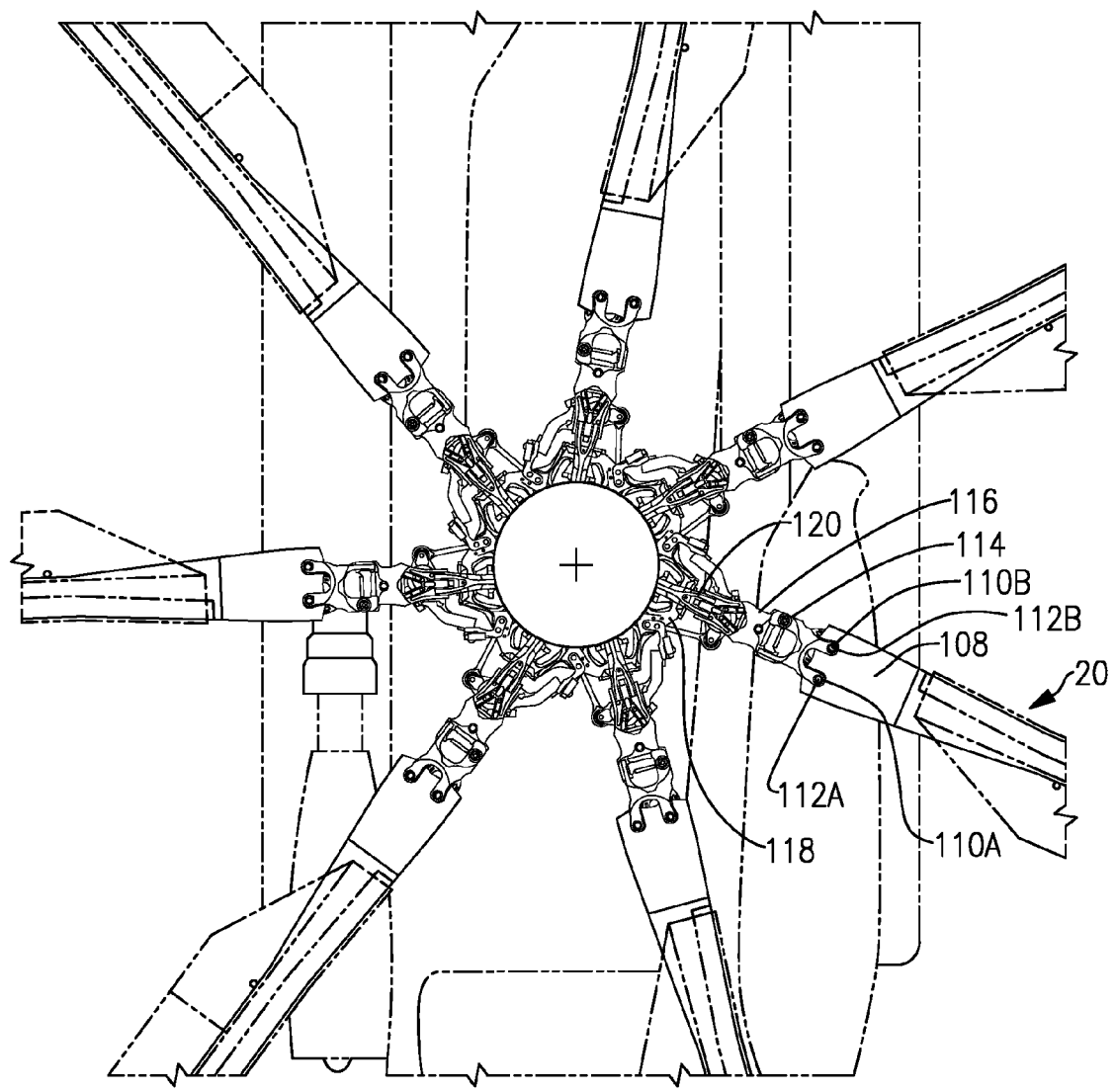
FIG. 12B is an expanded top view of the main rotor system illustrating an integral cuff of the main rotor blade spar.

Referring to FIG. 12B, the first aperture 110A and the second aperture 110B receive a first pin 112A and a second pin 112B to directly attach an integral hinge cuff 114 to the main spar 48. That is, the root section 100 forms the integral cuff 108 for direct mount of the rotor blade assembly 20 without the conventional root laminate and integral cuff plate which are bonded to the spar. That is, conventional cuff attachment assemblies are eliminated. The integral hinge cuff 114 is mounted to a sleeve 116 which is then mounted to a rotor hub 118 through a yoke 120.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A main rotor blade assembly comprising:
a main spar which comprises a root section and a main section, said root section forms an at least partially hollow integral cuff.

2. The main rotor blade assembly as recited in claim 1, wherein the at least partially hollow integral cuff is formed together with the main spar.

3. The main rotor blade assembly as recited in claim 1, wherein the at least partially hollow integral cuff is a monolithic structure together with the main section.

4. A main rotor blade assembly comprising:
a main spar which comprises a root section and a main section, said root section forms an integral cuff, wherein a lateral section through said integral cuff defines a first wall thickness and a lateral section through said main section defines a second wall thickness, said first wall thickness greater than said second wall thickness.

5. The main rotor blade assembly as recited in claim 4, wherein said integral cuff defines a first chord and said main section defines a second chord, said first chord greater than said second chord.

6. The main rotor blade assembly as recited in claim 4, wherein said root section defines a first hub mount aperture and a second hub mount aperture.

7. The main rotor blade assembly as recited in claim 4, further comprising a tip spar mounted to said main spar in an overlap relationship.

8. The main rotor blade assembly as recited in claim 7, wherein said overlap relationship extends between an inboard radial station of approximately eighty nine percent (89% x/R) and an outboard radial station of approximately ninety two percent (92% x/R).

9. The main rotor blade assembly as recited in claim 4, wherein the root section, the main section, and the integral cuff are a single unitized structure.

10. A rotary wing aircraft comprising:
a rotor hub assembly;
a main spar which comprises a root section and a main section, said root section forms an integral cuff having a first wall and a second wall spaced from said first wall, said first wall providing a first hub mount aperture and a second hub mount aperture;
a first pin which passes through said first aperture to mount said main spar to said rotor hub assembly; and
a second pin which passes through said second aperture to mount said main spar to said rotor hub assembly.

11. The aircraft as recited in claim 10, wherein the integral cuff is formed together with the remaining portions of the main spar.

12. A rotary wing aircraft comprising:
a rotor hub assembly;

a main spar which comprises a root section and a main section, said root section forms an integral cuff having a first hub mount aperture and a second hub mount aperture;

a first pin which passes through said first aperture to mount said main spar to said rotor hub assembly; and a second pin which passes through said second aperture to mount said main spar to said rotor hub assembly, wherein a lateral section through said integral cuff defines a first wall thickness and a lateral section through said main section defines a second wall thickness, said first wall thickness greater than said second wall thickness.

13. The aircraft as recited in claim 12, further comprising:
a tip spar attached to said main spar in an overlap relationship, said tip spar defining a non-straight form;
an upper blade skin adjacent to said main spar and said tip spar; and
a lower blade skin adjacent to said main spar and said tip spar.

14. The aircraft as recited in claim 13, wherein said end section of said main spar comprises a reduced perimeter stepped section to receive said tip spar.

15. The aircraft as recited in claim 13, wherein said tip spar defines a non-straight form.

16. The aircraft as recited in claim 13, further comprising
a main core adjacent said main spar; and
a tip core adjacent said tip spar.

17. The aircraft as recited in claim 16, wherein said tip core defines an anhedral form at an approximately ninety six percent a radial station (96% x/R).

18. The aircraft as recited in claim 16, wherein said main core comprises a leading edge contour which generally matches a trailing edge of said main spar and said tip core comprises a leading edge contour which generally matches a trailing edge of said tip spar.

19. The aircraft as recited in claim 12, further comprising:
a tip spar attached to said main spar in an overlap relationship, said tip spar defining a non-straight form;
a main core adjacent said main spar;
a tip core adjacent said tip spar, a core interface between said main core and said tip spar offset inboard from an inboard radial station of said overlap relationship.

20. The aircraft as recited in claim 19, wherein said main core comprises a leading edge contour which generally matches a trailing edge of said main spar and said tip core comprises a leading edge contour which generally matches a trailing edge of said tip spar.

21. The aircraft as recited in claim 12, wherein said integral cuff defines a first wall thickness and said main section defines a second wall thickness, said first wall thickness greater than said second wall thickness.

22. The aircraft as recited in claim 12, wherein the root section, the main section, and the integral cuff are a single monolithic structure.

23. A method of mounting a main rotor blade assembly comprising:
forming an integral cuff into a root section of a hollow main spar; and
attaching the integral cuff directly to a rotor hub assembly.

24. A method as recited in claim 23, wherein attaching the main spar directly to a rotor hub further comprising pinning the main spar to an integral hinge cuff of the rotor hub assembly.

* * * * *